United States Patent Office 3,491,290
Patented Jan. 20, 1970

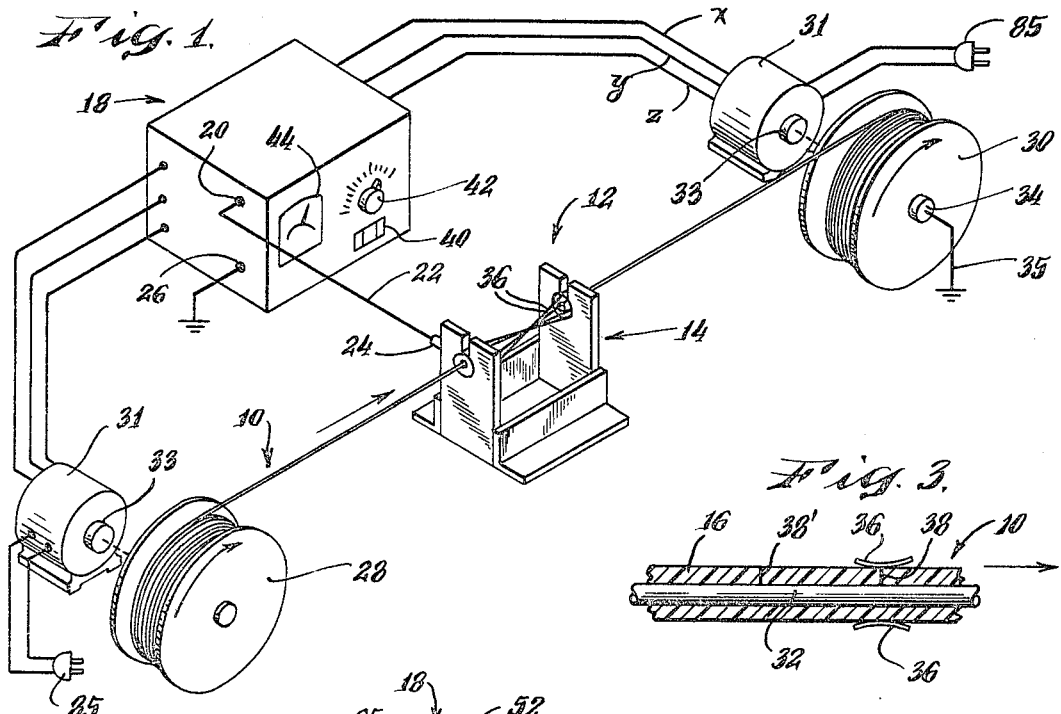
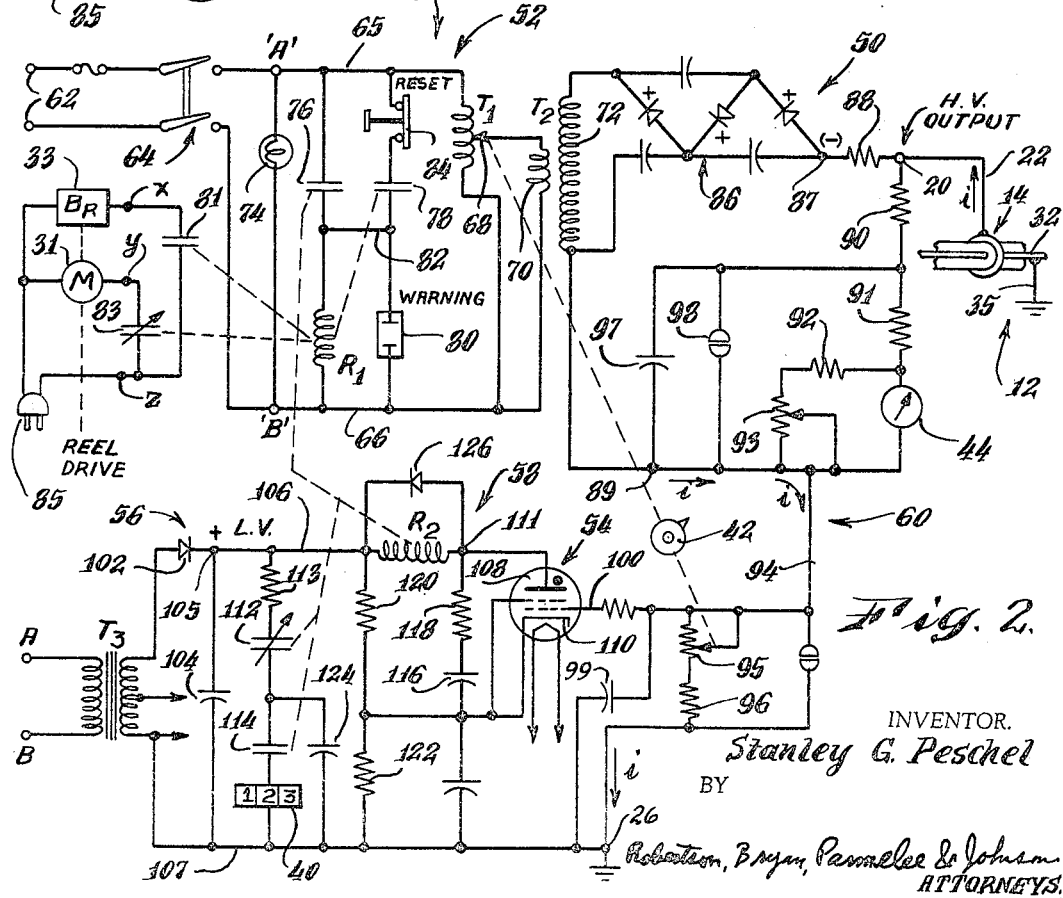

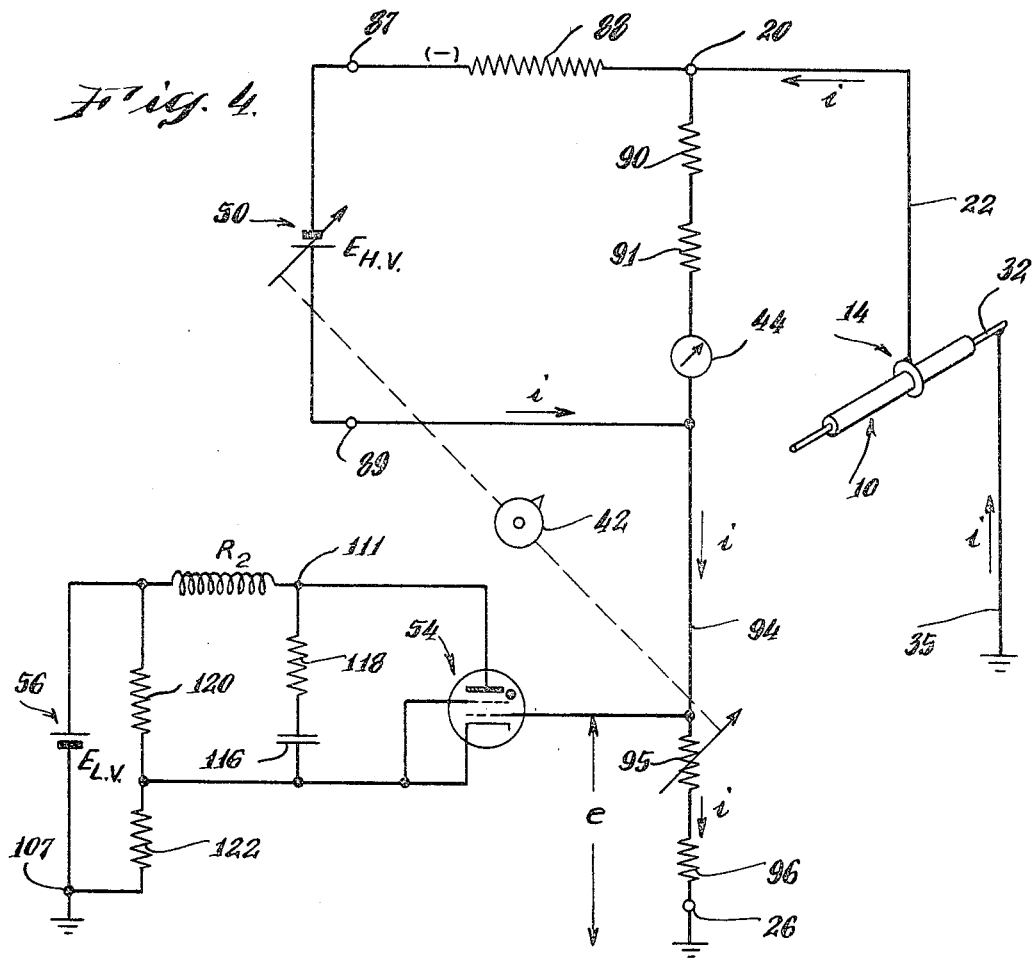
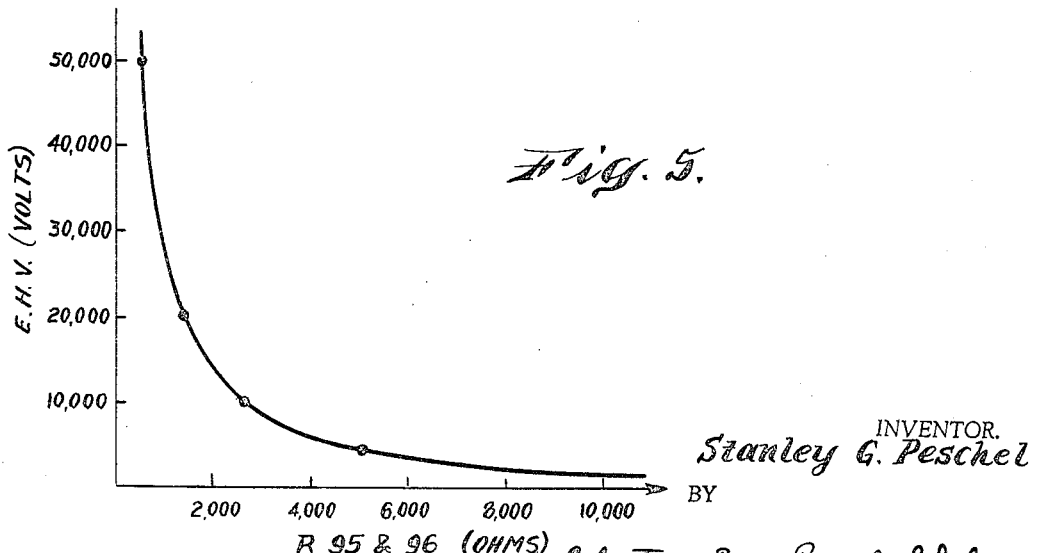

1

3,491,290
QUICK-RESPONSE HIGH VOLTAGE TEST SYSTEM FOR LOCATING AND RESOLVING FAULTS IN INSULATION OF ELECTRICAL CABLES
Stanley G. Peschel, Brewster, N.Y., assignor to Hipotronics, Inc., Brewster, N.Y., a corporation of New York
Filed Oct. 27, 1967, Ser. No. 678,696
Int. Cl. G01r 31/12
U.S. Cl. 324—54                    8 Claims

ABSTRACT OF THE DISCLOSURE

The high-voltage test system for insulation covering on electrical wires and cables, telephone wires, etc. provides uniquely fast response in locating and signalling the presence of faults in the insulation covering. Cable to be tested is enabled to be run through a test electrode at a high speed, such as one thousand feet per minute, and the fault signalling and counting circuit response is so quick as to locate and resolve two separate faults which are spaced few inches apart along the length of the cable, thus achieving an accurate count of the total number of faults in the whole cable at high speed. Moreover, the desired level of the H.V.D.C. test voltage can be adjusted over a continuous range up to a high value, such as 50,000 volts or down to zero, depending upon the thickness of the insulation on the cable being tested, without adversely affecting the quick-response accurate fault resolution.

In telephone systems it is common to use a type of cable in which approximately one thousand pairs of insulated conductors are enclosed in a single insulation sheath. When a fault occurs, it is a major job to open up the cable and to separate the many individual wires to repair the fault and to re-sheath the cable. This cable may be in an overhead location or it may be located underground, but in either case an expensive, time-consuming repair job is involved.

Because of the continuing expansion of telephone and communication systems there are many thousands of miles of wire and cable which are being manufactured each month for installation on which the insulation covering must be checked for freedom from faults before the cable is placed in service.

In order to test the insulation, the practice is to run the wire through a test electrode for applying a direct current (D.C.) test voltage to the insulation covering, while the electrical conductor in the wire is grounded. Any fault in the insulation covering allows a current to flow between the test electrode and the grounded conductor, causing a suitable indication to be given and actuating a counter.

Among the difficulties associated with test test systems prior to the present invention are their slow response which has allowed faults to pass undetected. It is not unusual for the faults in insulation covering to occur in multiples. During the manufacturing of the wire an adverse condition can produce two or three faults located few inches apart along the length of the cable. On the other hand, in many cases the faults occur singly and they are spaced hundreds of feet from each other. The prior slow-response equipment works satisfactorily when the faults are single ones and are widely spaced, or when the wire being tested was passed at a slow speed.

However, in the case of multiple closely spaced faults, the prior equipment often would not be able to sense the presence of each one. That is, there would be a response to the first one, and the others would pass undetected, giving inaccurate, low total count of the faults along the full length of the wire or cable.

2

It is among the objects of the present invention to overcome the foregoing limitations of the prior art to provide more accurate cable insulation fault counting and fault location at high production speeds.

This invention provides several advantages from the fact that it enables insulation covering to be high-voltage tested accurately and at increased production speeds, while resolving and indicating each and every fault above a sensitive minimum threshold spacing. The result is increased reliability in service as well as increased production speeds. In addition the systems embodying this invention can be adjusted over a wide operating range for testing many different sizes and types of wire and cable, thus being easy to use under many different production conditions.

As an example of the flexibility in usage of the present test system, it is noted that this system may be used to test the individual insulated wires in a telephone cable, and the same system or same type of system can be used to test the cable sheath.

In this specification and in the accompanying drawings is described and shown a quick-response high-voltage test system for locating and resolving faults in insulation covering on electrical wires and cables embodying the present invention, and it is to be understood that this illustrative embodiment is the best mode which is now contemplated for practicing the invention, but this illustrative example is not intended to be exhaustive nor limiting of the invention. This illustration is given and specified in detail in order that others skilled in the art may fully understand the invention and will appreciate how to modify and adapt systems embodying the invention in various equivalent forms, each as may be best suited to the conditions of a particular use.

The various objects, aspects and advantages of the present invention will be more fully understood from a consideration of the following specification in conjunction with the accompanying drawings, in which:

FIGURE 1 is an illustration of a system for highvoltage testing the insulation covering on an electrical cable being run at high speed through a test electrode;

FIGURE 2 is a schematic circuit diagram of the highvoltage test system providing quick-response to and accurate counting and indication of any faults which may be present in the insulation covering;

FIGURE 3 is an enlarged sectional view of an electrical cable with two closely spaced faults in its insulation covering;

FIGURE 4 is a schematic circuit diagram for purposes of explanation; and

FIGURE 5 is a plot of the relationship of signal pickup resistance to test voltage.

In operation the electrical cable 10 to be tested, for example, such as a telephone wire, is passed through a test zone 12 containing suitable test electrode means 14 for applying a D.C. high voltage stress to the insulation covering 16. It is advantageous to utilize a test electrode which will accommodate a wide range of sizes of wire or cable diameters while closely surrounding the periphery of the insulation covering so as to apply the high-voltage uniformly to all points on its circumference. A test electrode 14 for accomplishing these purposes is illustrated and is described in detail and claimed in my Patent No. 3,310,735. It is to be understood that this test electrode 14 is illustrative, and any suitable test electrode may be used if desired. However, in many cases it is believed that the user will find that the test electrode as described will operate to advantage as compared with other devices.

The quick-response test system 18 has a D.C. test high voltage (H.V.) output terminal 20 which is connected by a lead 22 to a terminal 24 of the test electrode, and the other terminal 26 of the system 18 is connected to a suitable electrical return, i.e. it is grounded. The cable 10 being tested is payed out at high speed, for example at one thousand feet per minute, from a suitable source, such as a large reel 28, is run through the test electrode means 14, and is taken up by a take-up device, such as another large reel 30. The reel 30 is shown as being driven by suitable motor means 31, and as is indicated in FIGURE 2, electromagnetic brake means 33 may be associated with the motor. If desired, similar motor and brake means 31, 33 may be connected to the other reel 28.

In order to have the cable conductor 32 (FIG. 3) at ground potential, the leading end of this conductor is connected to the hub 34 of the reel 30 which in turn is grounded through its bearings as indicated at 35 in FIGURE 1. In the test electrode means 14 are multiple conductive element means 36 which are in circuit with the terminal 24 so as to apply the test voltage to the periphery of the insulation covering 16. When a fault 38 (FIG. 3) is present, current can flow between the cable conductor 32 and the conductive element means 36, thus completing a circuit between ground 35 and the output terminal connection 20 of the test system. The system 18 gives a warning indication of the presence of the fault 38 and actuates a counter therein, as explained in detail further below, which has a counter read-out dial 40. The next fault 38' is also indicated and accurately counted. If desired, the wire drive means 31, 33 may be automatically controlled so as to quickly stop the wire when a fault is located, as will be explained further below.

A control knob 42 adjusts the designed level of D.C. high-voltage to be used for the test, and a voltmeter 44 indicates the adjusted value.

The system 18, as shown in FIGURE 2, comprises generally a high-voltage (H.V.) D.C. source 50 for supplying test voltage to the output terminal 20, a fault-signalling, warning, and wire-feed control circuit 52, a trigger-type electrical device 54, a low-voltage D.C. source 56, a counter circuit 58, and a circuit 60 connected between the output terminal 20 and the return (ground) terminal 26.

In order to energize the system 18 a suitable source of A.C. electrical power, such as 115-volt, 60-cycle current is supplied through input terminals 62, a main on-off switch 64, to a pair of leads 65 and 66 which are connected to opposite sides of an adjustable auto-transformer $T_1$. This autotransformer $T_1$ has a sliding contact 68, and a control knob 42 nerves to adjust the position of the sliding contact 68 as indicated to adjust the A.C. voltage supplied to the primary winding 70 of a step-up transformer $T_2$ having a H.V. secondary 72.

In the fault signalling warning-circuit 52 is a power-on signal lamp 74 connected across leads 65, 66. Also connected across these leads 65, 66 are normally-open relay contacts 76 in circuit in series with a replay winding $R_1$ which controls normally-open contacts 78. This relay winding $R_1$ is also shown as controlling a motor and brake 31, 33 for controlling the reel drive, as will be explained in greater detail below.

When a fault 38 (FIG. 3) is sensed, the contacts 76 become closed by another relay winding $R_2$, thus energizing relay $R_1$ to close contacts 78 for lighting a warning lamp 80. Because the contacts 78 are connected by lead 82 in parallel with contacts 76, the relay $R_1$ remains locked in self-holding condition, until the operator presses a manual reset switch 84 which is in series with the contacts 78. Accordingly, the warning light 80 remains on until the operator has responded by pressing the reset button.

Regardless of how long it takes the operator to respond to the first fault, the counter 40 will continue to count each fault 38' which occurs thereafter, as will be explained in detail further below.

If it is desired to stop the movement of the wire 10 whenever a fault 38, 38', etc. is encountered, then the relay winding $R_1$ is arranged to control normally-open contacts 81 and normally-closed contacts 83 in a wire drive circuit. The reel drive motor 31 is energized from a suitable power source 85 through the normally-closed contacts 83. When a fault appears, then the contacts 83 are opened by the relay winding, and the contacts 81 are closed so that the motor 31 is deenergized and the electromagnetic brake 33 is energized to stop the wire movement. This enables the operator to mark the wire to show the location of the fault, or to repair it, as may be desired, before continuing to test more of the wire. When the reset switch 84 is pressed, the relay winding $R_1$ is deenergized to release brake 33 and to start motor 31.

The three connections from the relay contacts 81 and 83 in the test system 18 to the motor and brake 31 and 33 are indicated at X, Y and Z.

By turning the knob 42 to move the tap 68, the operator can adjust the voltage supplied to the primary 70 of the step-up transformer $T_2$. Thus, advantageously, the H.V. output can be adjusted over a continuous range from zero up to a maximum, such as 50,000 volts. To the secondary 72 of this transformer $T_2$ is connected a voltage-tripler rectifier and filter network 86 including electrolytic capacitors and solid state rectifiers. The transformes $T_2$ and the tripler, rectifier-filter network 86 are immersed in an oil-filled hermetically sealed bath to insulate the circuit components and protect them from electrostatic dust attraction.

In order to protect the user, there is a 5 megohm current-limiting resistor 88 in series between the supply terminal 87 of the high voltage source and the H.V. output terminal 20, thus limiting the output current to 0.01 ampere even if the user should inadvertently short-circuit the terminal 20 to ground.

Between the H.V. output terminal 20 and the return terminal 26 is connected a circuit 60 which includes, all effectively in series: a meter-multiplier resistor 90, a meter-protection resistor 91, a meter-calibrating resistors 92 and 93, a connection 94, a potentiometer 95, a resistor 96 connected to the terminal 26. The voltmeter 44 is shunted across resistors 92 and 93. The purpose of the capacitor 97 and neon lamp 98, which are shunted across the meter and resistor 91, is to act as arc suppressors to prevent meter burn out. The other terminal 89 of the H.V. secondary 72 is in circuit with the connection 94. The meter 44 indicates the high voltage being supplied at the output terminal 20.

The potentiometer 95 is controlled by the knob 42 in an inverse relationship with respect to the slidable contact 68 of the output voltage adjusting autotransformer $T_1$. Thus, as the output voltage (H.V.) is increased, the effective resistance of the potentiometer-resistor combination 95, 96 is decreased. This inverse adjustment causes the voltage applied to the trigger electrode 100 of the trigger-type device 54 when a fault occurs to remain at the same level regardless of the level of the H.V. output.

For example, assuming that the H.V. voltage $E_{H.V.}$ is set at 50,000 volts. Then, when a fault is encountered, a fault current ($i$) flows in a circuit path as shown most clearly in FIGURE 4. This current flows from one side 89 of the high voltage source 50 through the potentiometer 95 and resistor 96 and through terminal 26 and the ground connection 35 and the conductor 32, and through the fault and test electrode 14, through connection 22, terminal 20, the 5-megohm resistor 88 to the other side 87 of the high voltage source 50. The resistor 88 in conjunction with the adjusted voltage $E_{H.V.}$ of the source 50 establishes the magnitude of the fault current $i$;

(1) $$i = \frac{E_{H.V.}}{R_{88}} = \frac{50 \text{ kv.}}{5 \text{ megohm}} = 0.01 \text{ amp.}$$

In order to trigger the device 54 in this circuit, a trigger voltage ($e$) of 5 volts is required. This trigger voltage is provided by the fault current ($i$) passing through a fault-signal pick-up resistance, constituting the potentiometer 95 and resistor 96:

(2) $$R_{95+96} = \frac{e}{i} = \frac{5 \text{ v.}}{0.01a} = 500 \text{ ohms}$$

The relationship between the voltage $E_{H.V.}$ and the fault-signal pick-up resistance $R_{95+96}$ in ohms through which the fault current flows is set forth in the following table and is shown in the plot of FIGURE 5.

| $E_{H.V.}$ | $R_{95+96}$ |
|---|---|
| 50,000 | 500 |
| 20,000 | 1,250 |
| 10,000 | 2,500 |
| 5,000 | 5,000 |
| 2,000 | 12,500 |
| 1,000 | 25,000 |

It is seen that the resistance $R_{95+96}$ varies inversely with respect to $E_{H.V.}$ in a hyperbolic relationship, to provide the desired constant magnitude of trigger voltage ($e$) regardless of the adjusted value of the high voltage supply $E_{H.V.}$.

In operation the potentiometer-resistor combination 95, 96 constitutes the fault-signal voltage pick-up resistance which is in circuit in series with the other terminal 89 of the H.V. source and with the conductor 32 of wire 10 being tested. Passage of the fault current $i$ through the signal pick-up resistance 95, 96 triggers the device 54 momentarily into conduction, thus activating the counter 40 and momentarily closing the relay contacts 76.

The trigger device 54 is shown as a Thyratron gas tube having a one-half microsecond response (firing) time, with the low-voltage source 56 serving to energize this gas tube 54. A capacitor 99 of 100 micro-micro-farads shunted across the signal pick-up resistance 95, 96 serves to desensitize the circuit so that a fault signal of a duration of at least 5 microseconds is required to actuate the system 18. The purpose of desensitizing the trigger device is to prevent its inadvertent triggering by line transients. Also, there is a neon lamp connected across the resistance 95, 96 as shown to limit the peak voltage which may be applied to the gas tube grid 100.

Electrical power for the low voltage source 56 is supplied through the terminals A, B which are connected to leads 65 and 66 at points 'A' and 'B' to energize the primary of a power-supply transformer $T_3$. The secondary of this transformer $T_3$ is connected through a rectifier 102 to a filter capacitor 104 to provide low voltage D.C., e.g. 160 volts, at the connection point 105. This low voltage (L.V.) terminal 105 is connected by lead 106 through a relay winding $R_2$ to a first terminal 108 (the anode terminal) of the trigger device 54, and the other lead 107 of the low voltage source 56 is grounded.

In order to be ready at all times to provide a response when a fault 38 is encountered, the trigger device 54 must be continuously energized, i.e. by D.C. Yet it is accepted knowledge that when a trigger device, such as a Thyratron tube is continuously energized by D.C., it will remain in a conducting state once its trigger electrode 100 has been actuated. If it remains in a conducting state it will not be ready to respond when the next fault 38' is encountered. Thus, these two concepts are mutually inconsistent.

Advantageously, in this system the anode 108 to cathode 110 circuit of the device 54 remains continuously energized by the D.C. source 56, and yet the system acts to extinguish the device 54 very quickly while assuring that the relay $R_2$ becomes actuated. Thus, quick response is provided to sense the occurrence of the next fault 38'. The relay winding $R_2$ controls normally-open contacts 76, normally-closed contacts 112 and normally-open contacts 114.

There is a capacitor 116 in series with a resistor 118 which are connected across the first and second terminals 108, 110 (anode-cathode circuit) of the trigger device 54. During quiescent conditions the capacitor 116 is charged up to a voltage determined by the voltage-dividing resistors 120, 122, which voltage is being applied across anode-cathode terminals 108, 110 of the trigger device.

As soon as a fault signal appears at the trigger electrode 100, the device 54 is fired, and immediately the voltage at the connection point 111 starts dropping because of the large impedance (5,000 ohms) of the relay winding $R_2$. The capacitor 116 discharges very quickly through the conducting device 54 so that the voltage at the point 111 drops abruptly thus extinguishing conduction through the device 54.

The capacitor 116 having been discharged, draws current through the relay winding $R_2$ from the supply terminal 105, thus maintaining current flow through the winding $R_2$ even though the trigger device 54 has been shut off. In this manner the relay $R_2$ becomes fully actuated to close its normally open contacts 76 and 114 and to open its normally closed contacts 112.

Moreover, while the capacitor 116 is being charged it maintains the voltage at the point 111 sufficiently low to prevent the device 54 from becoming re-ignited even though the fault 38 may still be adjacent to the conductive elements 36 of the test electrode 14.

The capacitance of capacitor 116 is 0.47 microfarads to provide a time-constant in conjunction with the impedance (5,000 ohms) of the relay winding $R_2$ which is just sufficient, to actuate the relay $R_2$. The resistor 118 has a small resistance (100 ohms) and its purpose is to limit the peak current flowing through the device 54 when the capacitor 116 begins discharging.

When the relay $R_2$ is actuated, the contacts 112 are opened to isolate the counter circuit from the lead 106. At the same time the contacts 114 become closed to allow a capacitor 124 of relatively large capacitance (16 microfarads) to discharge through the counter 40 to positively actuate the counter even though the relay $R_2$ is almost immediately returned to its normal state. In this system the relay $R_2$ is actuated in 12 milliseconds and bounces back to its initial condition in another 12 milliseconds. A diode 126 allows back E.M.F. across the relay $R_2$ to dissipate to speed up the response.

In its advantageous operation the isolated counter circuit sees the charged capacitor 124 as a power source having zero impedance, thus sending a momentary large surge of current through the counter 40. This large surge of current from the zero impedance power source 124 provides fast and sure response of the counter 40.

Also, the operation of the contacts 112, 114 and of the capacitor 124 is to protect the counter 40 from overcounting or from being burned out. Only one brief surge of current flows through the counter 40 no matter how long the fault current ($i$) may flow. For example, if the operator is busy elsewhere and if the reel drive stops the wire when a fault 38 is adjacent to the test electrode, then the fault current will continue flowing. This continuation of fault current will re-trigger the device 54 after the time-constant has elapsed, but the counter 40 is not again actuated because the capacitor 124 has not become recharged.

When the contacts 112 are closed, the capacitor 124 recharges through a resistor 113 of 160 ohms which limits the peak value of the charging current.

The over-all response is so quick, that this system will resolve and count each of two faults 38, 38' which are spaced only six inches apart on a cable travelling at 1,000 feet per minute (11.3 miles per hour) or three inches apart on a cable travelling at 500 feet per minute, and so forth.

From the foregoing it will be understood that the present invention as described above is well suited to provide the advantages set forth and that many possible embodiments may be made of the various features of this invention all without departing from the scope of the invention as defined in the following claims. The terms and expressions which I have employed are used in a descriptive and not a limiting sense, and I have no intention of excluding equivalents of the invention as defined in the following claims.

What is claimed is:

1. A quick-response high-voltage test system for locating and resolving multiple faults in the insulation covering of electrical conductors comprising a first source of high voltage (H.V.) direct current having an H.V. output terminal and another terminal, said H.V. source including an adjustable transformer for adjusting the level of the test voltage appearing at said H.V. output terminal, a resistor of large resistance value in series with said H.V. output terminal, a test electrode connected to said output terminal adapted to have an insulated electrical wire moved past said test electrode for testing the insulation on the wire, fault-signal pick-up resistance means connected in circuit in series with the other terminal of said H.V. source and with the conductor of said wire being tested, said fault-signal pick-up resistance means having an adjustable resistance, trigger-type electrical device having a first and a second terminal with a trigger electrode for initiating conduction through said device between said first and second terminals, said trigger electrode being connected to be responsive to signal voltage of said pick-up resistance means caused by current flowing in said resistance means when a fault in the insulation covering encounters said test electrode for initiating said conduction, a second source of low voltage (L.V.) direct current, a relay having a high-impedance winding, said relay winding and the first and second terminal of said trigger device being in circuit in series with said L.V. source, a capacitor connected in circuit in parallel relation with said device and in series relation with said relay winding for discharging said capacitor through said device when said conduction is initiated, a counter arranged to be actuated by said relay, and manual control means for adjusting said transformer to adjust the test voltage and also for adjusting the resistance of said signal pick-up resistance means, said manual control reducing the resistance of said signal pick-up resistance as said output test voltage is increased, and vice versa.

2. A quick-response high-voltage test system for locating and resolving multiple faults in the insulation covering of electrical conductors as claimed in claim 1 in which the value of resistance varies inversely in hyperbolic relationship with respect to the adjusted value of the test voltage.

3. A quick-response high-voltage test system for locating and resolving multiple faults in the insulation covering of electrical conductors as claimed in claim 1 wherein said test system contains an electrical source of zero impedance and a pair of normally open relay contacts in circuit with said counter for connecting said zero impedance source to said counter, said relay winding when actuated closing said contacts, and said source of zero impedance sending a momentary large surge of current through said counter for positively actuating said counter in a quick response.

4. A quick-response high-voltage test system for locating and resolving multiple faults in the insulation covering of electrical conductors as claimed in claim 3 in which source of zero impedance is a capacitor having a large capacitance and said relay winding also controls normally closed contacts in circuit in series with said L.V. source and with said capacitor, said capacitor being charged by said L.V. source through said normally closed contacts, and said relay winding when actuated opening said normally closed contacts to isolate said counter and said capacitor from said L.V. source.

5. A quick-response high-voltage test system for responding to faults in the insulation covering of an electrical conductor travelling at high speed comprising a first source of high voltage (H.V.) direct current having an H.V. output terminal and another terminal, said H.V. source including an adjustable transformer for adjusting the test voltage provided at said H.V. output terminal, a resistor of large resistance value for limiting the magnitude of the output current to a low value in the event said H.V. output terminal is accidentally short circuited, a test electrode connected to said output terminal adapted to have an insulated wire moved past said test electrode at high speed, means for connecting the conductor of said wire to a common ground circuit, fault-signal pick-up resistance means connected in circuit in series relationship with said common ground circuit and said other terminal of said H.V. source, whereby the occurrence of a fault in the insulation of the wire moving past said test electrode causes a fault current ($i$) to flow in said resistance means, said pick-up resistance means having an adjustable resistance, a trigger-type gas tube having an anode, a cathode and a trigger electrode, said trigger electrode being responsive to an electrical signal ($e$) produced by the flow of said fault current in said pick-up resistance means, a second source of low voltage (L.V.) direct current for energizing said gas tube, a relay having a winding of high impedance, said winding being in circuit in series with said L.V. source and with the anode-cathode circuit of said gas tube, a capacitor in circuit in parallel relationship with the anode-cathode circuit of said gas tube, said capacitor being discharged through the anode-cathode circuit of said gas tube when said electrode is triggered and acting to shut off said gas tube and to prevent said gas tube from immediately becoming conducting again, said capacitor having a capacitance which coacts with the high impedance of said winding to provide a time-constant of sufficient duration to actuate the relay before the capacior has become recharged through said winding by said L.V. source, and adjustment means simultaneosuly adjusting both said adjustable transformer and said adjustable resistance for changing said resistance inversely with respect to the test voltage provided at said H.V. output terminal.

6. A quick-response high-voltage test system for responding to faults in the insulation covering of an electrical conductor travelling at high speed, as claimed in claim 5, in which said adjustment means adjusts said resistance in an inverse hyperbolic relationship with respect to the test voltage.

7. A quick-response high-voltage test system for responding to faults in the insulation covering of an electrical conductor travelling at high speed, as claimed in claim 5, including drive means for moving the insulated wire past said test electrode, said drive means including motor and brake means, normally closed relay contacts connected to said motor means and normally open contacts connected to said brake means, and said relay contacts being controlled by said relay for deenergizing said motor means and for applying said brake means to stop the insulated wire when said gas tube is triggered by the occurrence of a fault in said wire.

8. A quick-response high-voltage test system for counting the faults in the insulation covering of an electrical wire travelling at high speed comprising a source of high voltage (H.V.) test voltage, a current-limiting resistor and an H.V. output terminal in series with said source, a test electrode connectable to said H.V. output terminal for testing the insulation of the travelling wire, resistance means in circuit with the conductor of said wire and with said H.V. source, a trigger type device responsive to fault current flowing in said resistance, a relay having a winding in series with said trigger device, normally open relay contacts controlled by said winding, a counter in series with said contacts, a zero impedance electrical source in series with said counter and contacts, said contacts being closed by said relay winding when said device is triggered to allow said zero impedance source to send a momentary surge of current through said counter providing quick and positive actuation of said counter for quickly and accurately counting the faults, said zero impedance electrical source being a capacitor for providing said momentary surge of current, a source of low voltage (L.V.) and normally closed relay contacts in series with said L.V. source and said capacitor, said contacts being opened by said relay winding when said device is triggered for isolating the capacitor from said L.V. source.

References Cited

UNITED STATES PATENTS

| | | | |
|---|---|---|---|
| 1,938,684 | 12/1933 | Bond et al. | 324—54 |
| 2,712,112 | 6/1955 | Weeks | 324—54 |
| 2,809,348 | 10/1957 | Kellog et al. | 324—54 |
| 2,882,490 | 4/1959 | Sheets | 324—54 |
| 2,890,409 | 6/1959 | Van Kreuelen | 324—54 |
| 2,894,204 | 7/1959 | Gambrill | 324—54 |
| 2,927,254 | 3/1960 | Faulkner | 315—340 XR |
| 2,942,248 | 6/1960 | Huggins | 324—54 XR |
| 3,217,246 | 11/1965 | Kallet et al. | 324—54 |
| 3,237,109 | 2/1966 | Minard | 315—340 XR |
| 3,321,703 | 5/1967 | Tyszewicz | 324—54 |

FOREIGN PATENTS 1,430,990    1/1966    France.

GERARD R. STRECKER, Primary Examiner